(12) United States Patent
Gordon, III et al.

(10) Patent No.: US 9,931,763 B2
(45) Date of Patent: Apr. 3, 2018

(54) SYSTEM AND METHOD FOR CONTROLLING THE PERIPHERAL STIFFNESS OF A WET CERAMIC EXTRUDATE

(75) Inventors: Gilbert Franklin Gordon, III, Blacksburg, VA (US); Kevin Bruce Sterner, Christiansburg, VA (US); Ezra Morgan Yarnell, Corning, NY (US)

(73) Assignee: Corning Incorporated, Corning, NY (US)

(*) Notice: Subject to any disclaimer, the term of this patent is extended or adjusted under 35 U.S.C. 154(b) by 407 days.

(21) Appl. No.: 13/599,405

(22) Filed: Aug. 30, 2012

(65) Prior Publication Data

US 2014/0061963 A1 Mar. 6, 2014

(51) Int. Cl.
| | |
|---|---|
| B29C 47/00 | (2006.01) |
| B28B 11/24 | (2006.01) |
| F26B 21/00 | (2006.01) |
| B28B 17/00 | (2006.01) |
| B29C 47/88 | (2006.01) |

(Continued)

(52) U.S. Cl.
CPC ........ B28B 11/243 (2013.01); B28B 17/0081 (2013.01); B29C 47/0023 (2013.01); B29C 47/0028 (2013.01); B29C 47/881 (2013.01); B29C 47/8805 (2013.01); B29C 47/92 (2013.01); F26B 21/004 (2013.01); B29C 47/8835 (2013.01); B29C 47/908 (2013.01); B29C 2947/92209 (2013.01); F26B 2210/02 (2013.01)

(58) Field of Classification Search
CPC ...... C04B 33/30; B28B 11/243; B28B 11/005

USPC ... 264/630, 634, 638, 40.1, 40.3, 40.7, 40.6; 34/265, 241; 700/208, 211, 196; 454/66

See application file for complete search history.

(56) References Cited

U.S. PATENT DOCUMENTS

| | | | |
|---|---|---|---|
| 5,223,188 A | 6/1993 | Brundage et al. | 264/26 |
| 5,227,105 A * | 7/1993 | Eucker | B28B 3/20 264/102 |

(Continued)

FOREIGN PATENT DOCUMENTS

| | | |
|---|---|---|
| DE | 299 20 206 | 2/2000 |
| JP | H029452 A | 1/1990 |

(Continued)

OTHER PUBLICATIONS

Patent Cooperation Treaty International Notification of Transmittal of the International Search Report and the Written Opinion of the International Searching Authority, international application No. PCT/US2013/057227; dated Dec. 12, 2013, 15 pages.

(Continued)

*Primary Examiner* — Jeffrey Wollschlager
*Assistant Examiner* — Armand Melendez
(74) *Attorney, Agent, or Firm* — Joseph M. Homa

(57) ABSTRACT

The present disclosure provides a method of stiffening an outer layer of a wet extrudate, where the extrudate has a honeycomb cellular structure. The method includes extruding the extrudate through an extrusion apparatus and directing a substantially uniform flow of fluid onto the outer layer of the extrudate. The method also includes increasing the temperature of a binder material of the extrudate to its gelation point and stiffening at least the outer layer of the extrudate.

7 Claims, 9 Drawing Sheets

(51) Int. Cl.
  *B29C 47/92* (2006.01)
  *B29C 47/90* (2006.01)

(56) References Cited

U.S. PATENT DOCUMENTS

| | | | |
|---|---|---|---|
| 5,273,692 A | 12/1993 | Numoto et al. | 264/26 |
| 5,797,081 A | 8/1998 | Brundage et al. | 419/67 |
| 5,966,582 A | 10/1999 | Chalasani et al. | 419/34 |
| 6,432,341 B1 | 8/2002 | Yamaguchi et al. | |
| 7,320,183 B2 * | 1/2008 | Ishii et al. | 34/429 |
| 8,075,829 B2 * | 12/2011 | Takagi et al. | 264/432 |
| 2005/0093209 A1 | 5/2005 | Bergman et al. | 264/474 |
| 2005/0178022 A1 * | 8/2005 | Katsu | 34/443 |
| 2007/0006480 A1 * | 1/2007 | Ishii et al. | 34/265 |
| 2009/0166355 A1 | 7/2009 | Brundage et al. | 219/696 |
| 2009/0215377 A1 | 8/2009 | Ball | 454/66 |
| 2009/0294438 A1 * | 12/2009 | Adrian et al. | 219/681 |
| 2009/0320315 A1 * | 12/2009 | Horiba et al. | 34/265 |
| 2010/0078859 A1 * | 4/2010 | Takagi | B28B 11/241 264/432 |
| 2010/0237123 A1 * | 9/2010 | Fujioka | B28B 21/90 226/7 |
| 2012/0133065 A1 * | 5/2012 | Caffrey et al. | 264/40.1 |
| 2012/0226375 A1 | 9/2012 | Brown et al. | |

FOREIGN PATENT DOCUMENTS

| | | |
|---|---|---|
| JP | 04-101810 | 4/1992 |
| WO | 2009/005741 | 1/2009 |

OTHER PUBLICATIONS

English Translation of JP2015530021 First Office Action dated Feb. 14, 2017; 3 Pages; Japanese Patent Office.
English Translation of JP2015530021 Office Action dated Oct. 17, 2017; Japanese Patent Office; 2 Pages.

* cited by examiner

SYSTEM AND METHOD FOR CONTROLLING THE PERIPHERAL STIFFNESS OF A WET CERAMIC EXTRUDATE

FIELD OF THE DISCLOSURE

The present disclosure relates to an extrusion system and method for forming an extruded body, and in particular to an extrusion system and method for controlling the stiffness of the extruded body to reduce or prevent defects formed in the extruded body.

BACKGROUND

The extrusion of plasticized material mixtures into cellular structures (i.e., honeycomb) requires a delicate balance of deformability (for shape molding) and structural integrity (for shape retention). Such mixtures can include inorganic ceramic powders, a binder component and a liquid component, the amounts of which are controlled to maintain low pressure, torque, and temperature during the extrusion process while creating a self-supporting body which is able to be handled upon formation.

The cellular structure of the extrudate can be formed such that cells near the periphery of the formed body can have a smaller or reduced cross-section compared to cells near the middle or center of the body. In an ideal or pristine cellular structure, pressure equilibrium is achieved between the internal pressure of each cell and the ambient or atmospheric pressure outside the body. In some extrusion processes, however, the extrudate is cut to a desired length by a cutting tool such as a saw blade. As the extrudate is cut, the blade can "smear" or collapse the more delicate outer cells of the structure. Those cells with a smaller cross-sectional area tend to be more susceptible to smearing or collapsing during the cutting step due to their smaller size.

If a cell near the periphery or outer layer of the extrudate collapses due to smearing, the pressure equilibrium between the collapsed cell and the ambient is lost. Since the extrudate has a length dimension, each cell forms an elongated channel defined by this length. Thus, as the pressure equilibrium is destroyed when the cell collapses, one end of the channel is sealed causing the rest of the channel to collapse inward. The collapsed cell, or channel, thereby forms a visual defect referred to as a "skin groove" along the length of the extrudate.

A skin groove is undesirable as it is a visual defect that many customers do not want in the extruded part. More importantly, the skin groove can be the source of a higher stress concentration, and in some instances, cracks or microfissures can form in the groove. As cracks or microfissures develop, the structural integrity of the formed part is reduced and may result in a failed part.

Conventional techniques that have been used to reduce or eliminate skin grooves, albeit with moderate to little success, include improved cutting processes, ventilating the skin via mechanical or other scoring methods, stiffening the batch material by reducing the batch water percentage, and gelling and/or drying the skin of the extrudate with infrared or microwave energy. One such example of stiffening the wet extruded ceramic body through the use of microwave energy is described in U.S. Publication Ser. No. 2005/0093209 to Bergman et al., which is hereby incorporated by reference in its entirety. While the use of microwave energy has achieved positive results in some instances, microwave energy can result in non-uniform heating patterns particularly at or near the outer layers of the extrudate.

Thus, a need exists for improving the extrusion process, and in particular, the structural integrity of the wet ceramic extrudate prior to being cut. It is also desirable to provide a system that improves the structural integrity of the extrudate at or near the periphery thereof through a uniform means.

SUMMARY

In an exemplary embodiment of the present disclosure, a method is provided for stiffening an outer layer of a wet extrudate, where the extrudate has a honeycomb cellular structure. The method includes extruding the extrudate through an extrusion apparatus and directing a substantially uniform flow of fluid onto the outer layer of the extrudate. The method also includes increasing the temperature of a binder material of the extrudate to its gelation point and stiffening at least the outer layer of the extrudate.

In one aspect of the embodiment, the method can include removing a portion of water from at least the outer layer of the extrudate. In addition thereto, the method can comprise cutting the stiffened extrudate with a cutting tool. In another aspect, the method includes preventing the outer layer from collapsing due to the cutting step. Also, the method can comprise heating the fluid to a substantially uniform temperature with a heating unit. In doing so, the method can include measuring the temperature of the outer layer of the extrudate after the directing step and controlling the heating step to achieve gelation of the binder material.

In a further aspect, the method can include determining a rate of extrusion of the extrudate from the extrusion apparatus and controlling the heating step or the rate of extrusion to achieve gelation of the binder material. In addition, the outer layer of the extrudate can be heated to a substantially uniform temperature.

In another embodiment, an extrusion system is provided that includes an extruder configured to receive batch material having a binder component and extrude it through a die to form an extrudate. The system includes a controller, a fluid supply containing a fluid, and a temperature unit coupled to the controller and fluidly coupled to the fluid supply. The controller adjustably controls the output of the temperature unit to achieve a desired fluid temperature. The system also includes an applicator apparatus spaced from the die and having an inlet and an outlet such that the inlet is fluidly coupled to the temperature unit to receive the fluid. The outlet includes a defined opening structured to direct a substantially uniform flow of the fluid onto an outer layer of the extrudate to increase the temperature of the binder component to its gelation point and/or removing a portion of water from the outer layer.

In one aspect of this embodiment, the system includes a cutting tool spaced from the applicator apparatus. The cutting tool is adapted to separate the extrudate into at least two portions. The system can also include a measurement system in electrical communication with the controller. The measurement system can include a flow meter configured to measure the flow of fluid from the fluid supply to the temperature unit and a temperature sensor configured to measure the temperature of the outer layer of the extrudate. Based on the temperature measurement, the controller is configured to controllably adjust the fluid flow from the fluid supply.

In a related aspect, the extrusion system can also include an encoder in electrical communication with the controller. The encoder is adapted to measure a rate of extrusion of the extrudate from the extruder. Based on the temperature measurement, the controller is configured to controllably adjust the rate of extrusion, the output of the temperature unit, or the fluid flow from the fluid supply. In a different aspect, the applicator apparatus and encoder are disposed between the die and cutting tool. The applicator apparatus is disposed adjacent to the cutting tool and the encoder is disposed adjacent to the die.

In an aspect of the present embodiment, the applicator apparatus can include an annular housing having a first portion and a second portion, where the first portion and second portion are pivotably coupled to one another. The housing defines an opening between the first portion and second portion through which the extrudate passes. The applicator apparatus further includes a first body disposed in the first portion and coupled to the inlet of the applicator apparatus and a second body disposed in the second portion. The first body and second body define an outer chamber and an inner chamber, where the outer chamber is fluidly coupled to the inlet and the inner chamber and outer chamber are fluidly coupled to one another through a baffle plate. The apparatus also includes an insert disposed in the inner chamber of the first and second bodies such that the insert is fluidly coupled to the outlet. Related to this aspect, the opening defined at the outlet of the applicator apparatus comprises a plurality of slots defined in the insert.

In a different embodiment, a method is provided for controlling the stiffness of a wet cellular ceramic extrudate being formed from batch material having a binder component. The method includes extruding the extrudate through an extrusion apparatus, supplying fluid to a temperature unit, controlling the temperature of the fluid at the temperature unit, and moving the extrudate from the extrusion apparatus to an applicator apparatus. The method also includes directing the fluid from the temperature unit through an opening defined in the applicator apparatus, contacting an outer layer of the extrudate with a uniform flow of the fluid, increasing the temperature of the binder component to its gelation point, and passing the extrudate through the applicator apparatus to stiffen the extrudate.

In one aspect of this embodiment, the method includes measuring the temperature of the extrudate as it exits the applicator apparatus. In another aspect, the method includes measuring a flow rate of the fluid being supplied to the temperature unit, and measuring a rate of extrusion of the extrudate. Related thereto, the method can include determining if the measured temperature corresponds to a threshold temperature at which the binder component reaching its gelation point such that, if the measured temperature is below the threshold temperature, the method comprises adjustably controlling the fluid flow rate, the rate of extrusion, or the output of the temperature unit until the measured temperature reaches the threshold temperature. In a further aspect, the method can include receiving the fluid in an outer chamber of the applicator apparatus, circulating the fluid about the outer chamber, leaking the fluid through a plurality of openings defined in a baffle plate disposed between the outer chamber and an inner chamber of the applicator apparatus, and passing the fluid uniformly through one or more slots or holes defined in an insert of the applicator apparatus.

BRIEF DESCRIPTION OF THE DRAWINGS

The above-mentioned aspects of the present disclosure and the manner of obtaining them will become more apparent and the claimed invention itself will be better understood by reference to the following description of exemplary embodiments, taken in conjunction with the accompanying drawings, wherein:

Corresponding reference numerals are used to indicate corresponding parts throughout the several views.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of the invention as claimed herein.

For purposes of this disclosure, the terms "extrusion phase" or "extrude" as used herein mean the conveying or transporting of the batch material through the barrel of the extruder and forcing the batch material through the die assembly. The terms "flow direction" and "extrusion direction" are intended to be interchangeable and mean the direction by which the batch material is conveyed through the barrel and forced through the die assembly. In addition, the terms "extruder" and "extruder apparatus" are intended to be interchangeable.

The term "batch material" as used herein can be a wet mixture of dry ceramic raw materials, such as clay, talc, alumina and mullite, a binder/plasticizer, such as methylcellulose (a cellulose ether) or polyvinyl alcohol, and/or water. As an example, there can be between about 50-75% by weight dry ingredients and between about 25-50% by weight wet ingredients in the batch material. The batch material when reacted can form a ceramic material such as carbides, refractory oxides or cordierite.

Figure 1:
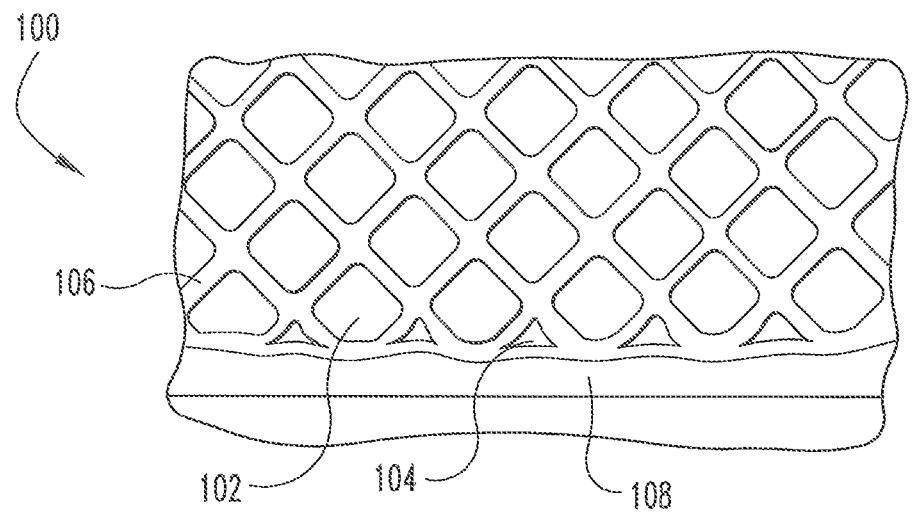
FIG. 1 is a partial cross-sectional view of a pristine outer cellular layer of a wet ceramic body.

Referring to FIG. 1, a cross-sectional portion of an exemplary wet ceramic extrudate is shown after being cut by a wet saw. The extrudate is formed of a honeycomb structure 100 in which a plurality of cells 102 are defined by internal walls 106 of material. As shown in FIG. 1, many of the internal cells 102 can be formed having four or more edges. The shape or structure of these internal cells 102 can depend on the type of extrudate being formed and the structure of the die assembly.

As shown in FIG. 1, however, the internal cells formed near the periphery of the extrudate can have a smaller cross-sectional area than those internal cells 102 spaced from the periphery 108. The periphery 108, or outer wall, of the extrudate can reduce the cross-sectional area of the outermost internal cells by approximately one-half. As an example, one such internal cell 104 is shown having a substantially triangular cross-section. In this example, the internal cell 104 has a defined interior (i.e., the cell 104 is in a desired condition).

Figure 2:
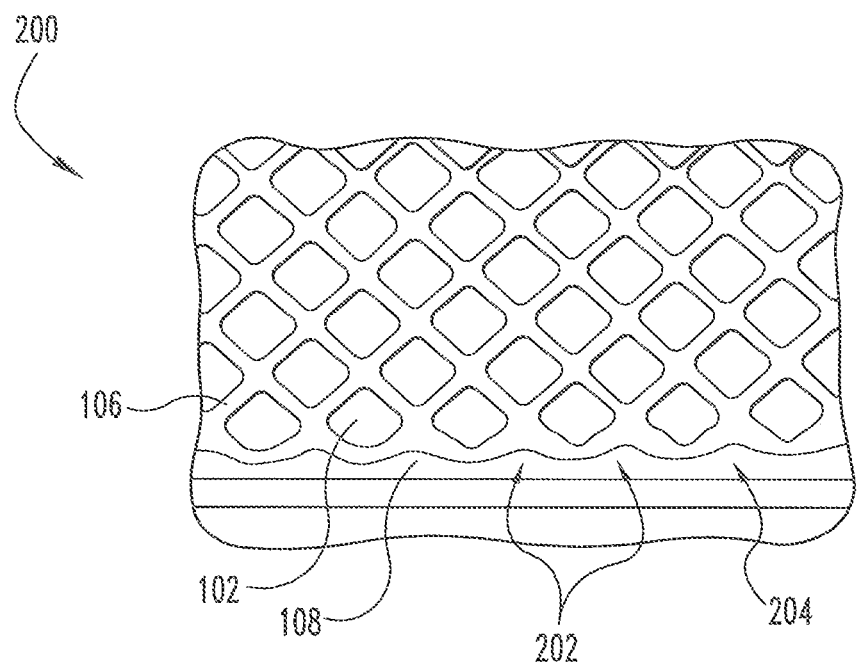
FIG. 2 is a partial cross-sectional view of a smeared outer cellular layer of a wet ceramic body.

Referring to FIG. 2, however, the internal cell 104 is smeared or collapsed. The honeycomb structure 200 of FIG. 2 can be representative of a different embodiment of a wet ceramic extrudate where one or more of the outermost internal cells 202 have collapsed. The structure 200 still includes the plurality of internal cells 102 that have the larger cross-sectional area. The smaller cross-sectional cells 202 are shown having collapsed and thus form a skin groove 204 along the length of the extrudate. As previously described, once the cell 202 collapses at one end of the extrudate, the pressure equilibrium between the internal pressure of the collapsed cell 202 and atmospheric pressure is lost thereby causing the cell 202 to collapse along its entire length. This collapse of the entire cell at the periphery 108 of the extrudate causes the formation of the skin groove 204.

Through different studies, it has been determined that the formation of these skin grooves occur over a progression of time. In other words, a first log (or wet extrudate) may be formed having a cross-section similar to the one shown in FIG. 1. However, after a number of logs have been formed and cut, the smaller internal cells near the outer layer of the log tend to get smeared by the cutting tool and eventually collapse. As more complex extrudates are formed, the cross-sectional area of these internal cells keeps getting smaller and therefore the likelihood of forming skin grooves increases.

As already described, the skin groove defect can be attributed to the softness and deformability of the material as it is extruded through an extruder. It is desirable for the material to be deformable so that a desired end product can be formed, but it is equally desired for the material to maintain a level of structural integrity as well. While conventional methods have sought to stiffen the material through microwave, radio-frequency or infrared energy, the results have been mixed due to the inability to uniformly stiffen the outer layer of internal cells of the material.

The present disclosure provides several embodiments for effectively stiffening the outer layer of internal cells to reduce or prevent one or more of these cells from collapsing. This disclosure is applicable to any plastically deformable material which is capable of being molded and shaped by extrusion. Such materials can include mixtures of inorganic powders (i.e., ceramic raw materials) and organic forming compounds (i.e., binders, surfactants, plasticizers, lubricants, and the like). At least one organic compound can have a thermal gel point, which in many instances is a binder component. Particularly suitable plastic materials can include mixtures capable of forming ceramic articles which contain cordierite and/or mullite. Examples of such mixtures can include 2% to 60% mullite, and 30% to 97% cordierite, with allowance for other phases, typically up to 10% by weight. Suitable binders for cordierite formation which have a thermal gel point are cellulose ether binders, such as methylcellulose, and/or methylcellulose derivatives.

Ceramic raw materials, binder and remaining organic components can be mixed with a liquid vehicle, such as water, to form a plasticized batch. The batch can enter an extruder and be extruded through a die. Extruders are well known in the art, and can comprise a ram or a screw feed that forces the material through the die. As the ceramic material leaves the extruder die it is in the shape of a long tubular mass, referred to as a "log" which is then cut to shape using a cutting tool such as a blade or wet saw.

The present disclosure can be suitable for different types of substrates, and in particular is well-suited to the process of extruding ceramic substrates. In conventional extrusion processes, the newly extruded log has a generally low wet strength, and is not generally firmly self supporting due to very thin webs (i.e., the honeycomb structure as shown in FIGS. 1 and 2). This can make the log difficult to handle in later processing steps (i.e., wet handling, cutting, and drying) without causing damage, such as through deformation. It also makes it difficult to cut the log to a desired length without causing the formation of a skin groove.

Plastically deformable materials of the type described above can include an organic binder component that has a thermal gel point. As the temperature increases toward the gel point, the viscosity of the materials decreases. However, when the gel point is reached, there can be a very rapid increase in the viscosity with increasing temperature. Therefore, in most conventional processes, plastically deformable materials of this kind tend to be worked and formed at temperatures just below the gel point of the organic binder.

Figure 3:
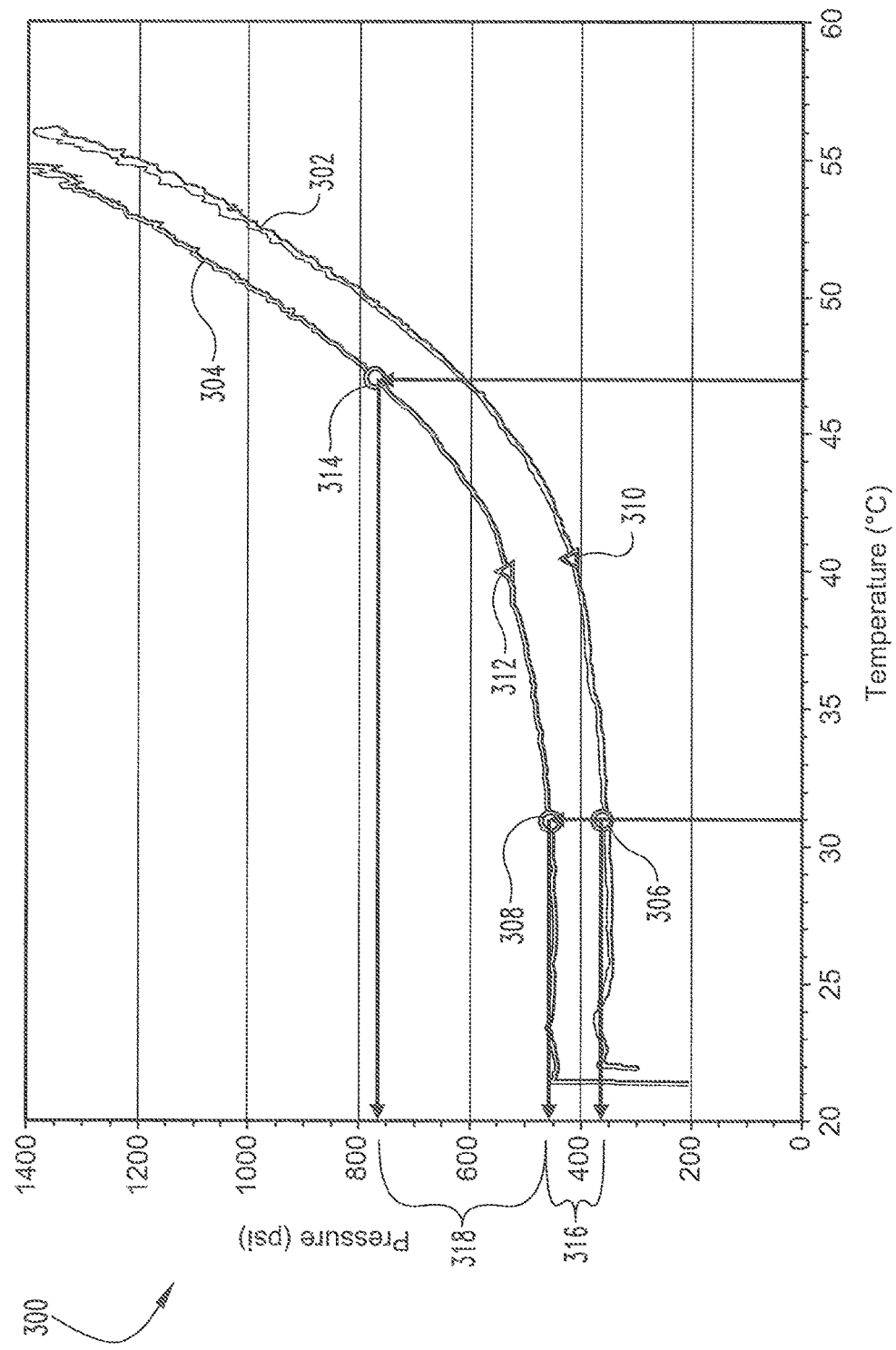
FIG. 3 is a graphical representation of two different extrudates in view of temperature and stiffness.

As shown in FIG. 3, however, the present disclosure provides embodiments at which the temperature of the binder component of the plastically deformable materials is increased to reach or exceed the gel point. Referring to FIG. 3, a graphical illustration 300 shows a study of two substantially identical plastically deformable materials having different water content. The first material, which is represented in FIG. 3 by line 302, has approximately 34% water. The second material, which is represented by line 304, has approximately 32% water.

In this study, a rheological method was used to subject each material to a range of increasing temperatures through a uniform application of heat to determine how the material would react with respect to stiffening of the organic binder in each material. To do so, a capillary rheometer temperature sweep was done to analyze the effects of removing at least a portion of water from each material versus heating each material. In FIG. 3, before each material is passed through an extruder, the skin temperature measured approximately 31° C. This is shown for the first material at reference point 306 and the second material at reference point 308.

During the extrusion process, the two materials exhibit a difference in capillary pressure which is correlated to the stiffness of the materials. Here, while the materials are at a steady-state condition, the difference in stiffness is attributed to the different water content between the materials. This difference is indicated by reference point 316, which is equivalent to approximately 100 psi in this study. Therefore, the difference of 2% in water contributes to about 100 psi change in the stiffness measure. Stated another way, it is determined that removing at least a portion of water from the material can contribute to about 100 psi change in pressure (and thus stiffness).

As each material was extruded through the extruder, the skin temperature was measured again. In many conventional extrusion processes, it is desirable to control the extrusion near the gelation point of the binder component without exceeding it. In a twin screw extruder, more material can be extruded by rotating the twin screws faster. As the twin screws rotate, more shear is induced in the batch material which increases the temperature of the material. In FIG. 3, reference point 310 represents the gelation point of the binder component of the first material. Similarly, reference point 312 represents the gelation point of the binder component of the second material. Each material was extruded right at or below the gelation point of the binder component.

After the extrusion process, however, each material was then passed through a temperature unit (e.g., heater) to further increase the skin temperature. As further shown in FIG. 3, as the second material exited the temperature unit, the measured skin temperature reached approximately 47° C. as shown by reference point 314. The measured skin temperature therefore surpassed the gelation point of approximately 40° C.

As shown in FIG. 3, increasing the skin temperature past the gelation point of the binder component can improve stiffening. In particular, the difference in pressure between reference point 314 and reference point 308 represents approximately 317 psi (i.e., identified by reference point 318), or roughly an improvement of 85% by heating the binder component to its gelation point. The remaining 15% is attributed to at least a portion of water being removed from the material after it is extruded. Thus, by uniformly applying heat to the wet extrudate upon exiting the extruder such that the binder component of the material reaches its gelation point, the stiffness of the skin layer can be increased to reduce or prevent the formation of skin grooves in this layer.

Figure 4:
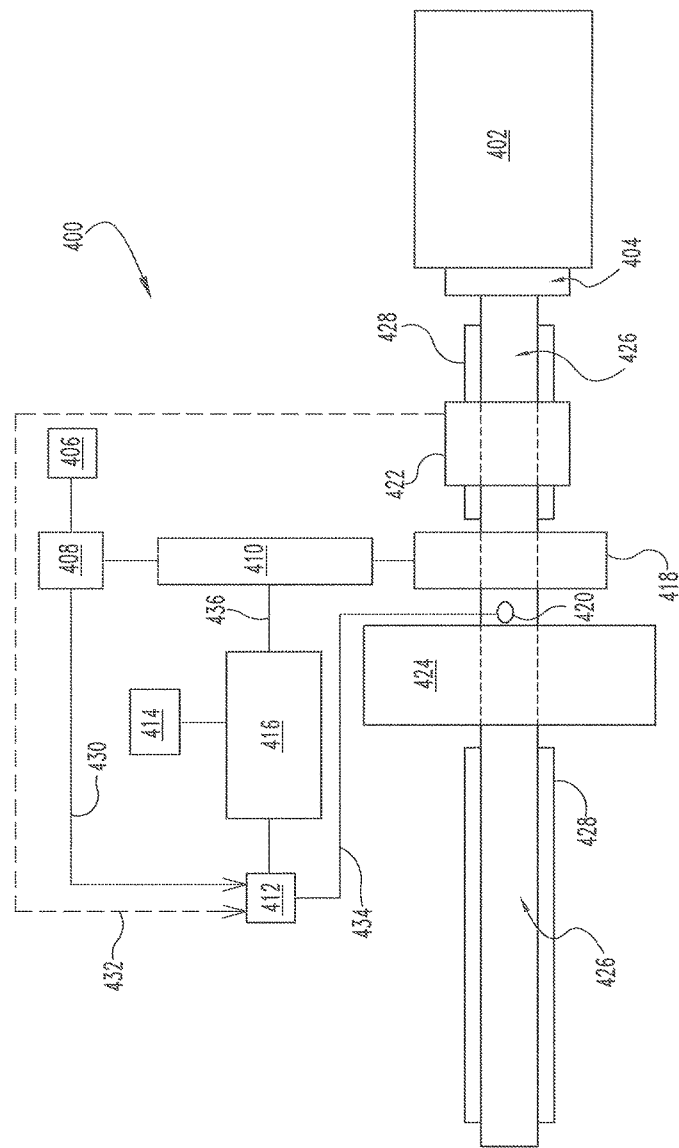
FIG. 4 is a block diagram of a first embodiment of an extrusion system.
Figure 5:
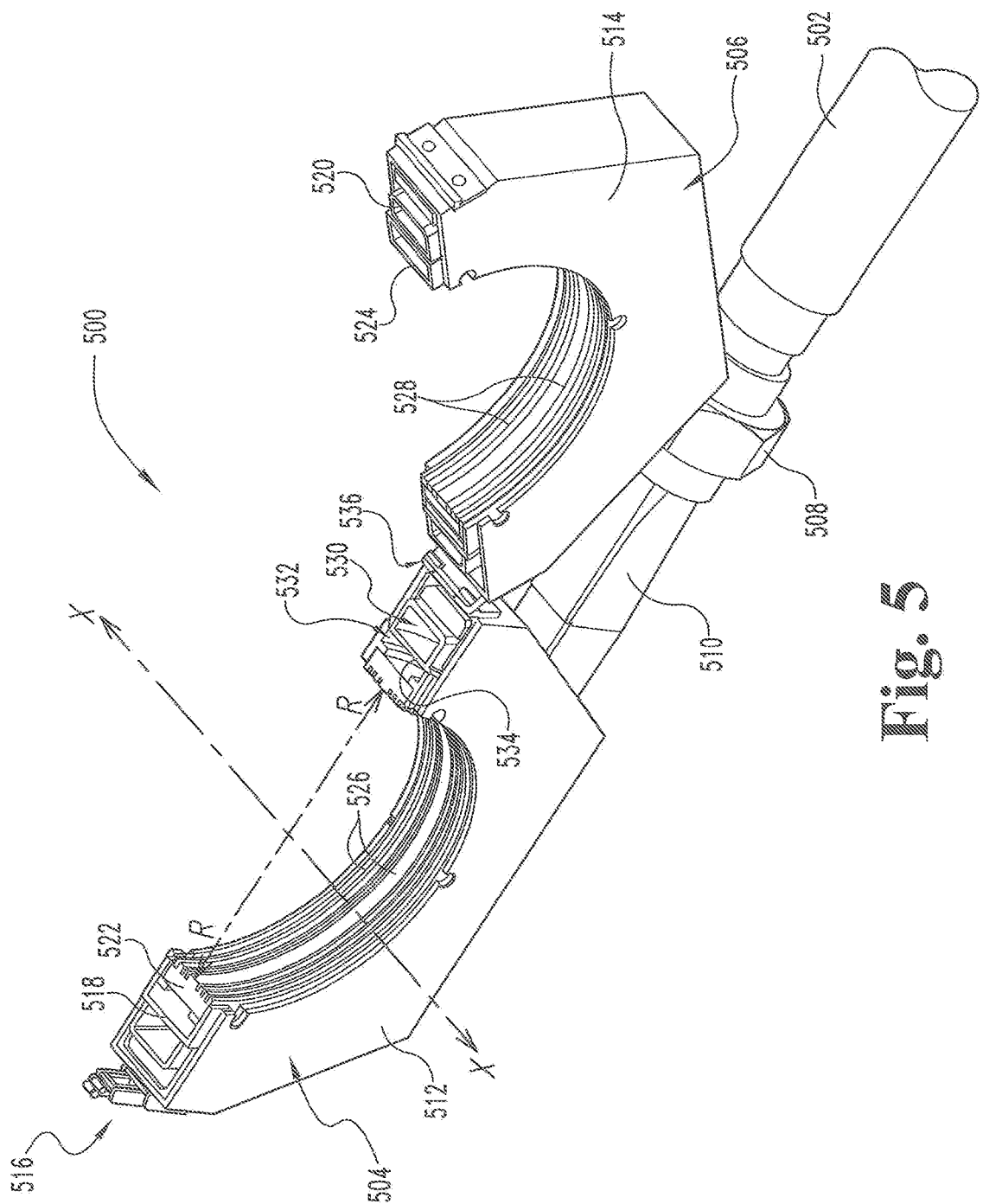
FIG. 5 is a cross-sectional view of a first embodiment of an applicator apparatus.
Figure 6:
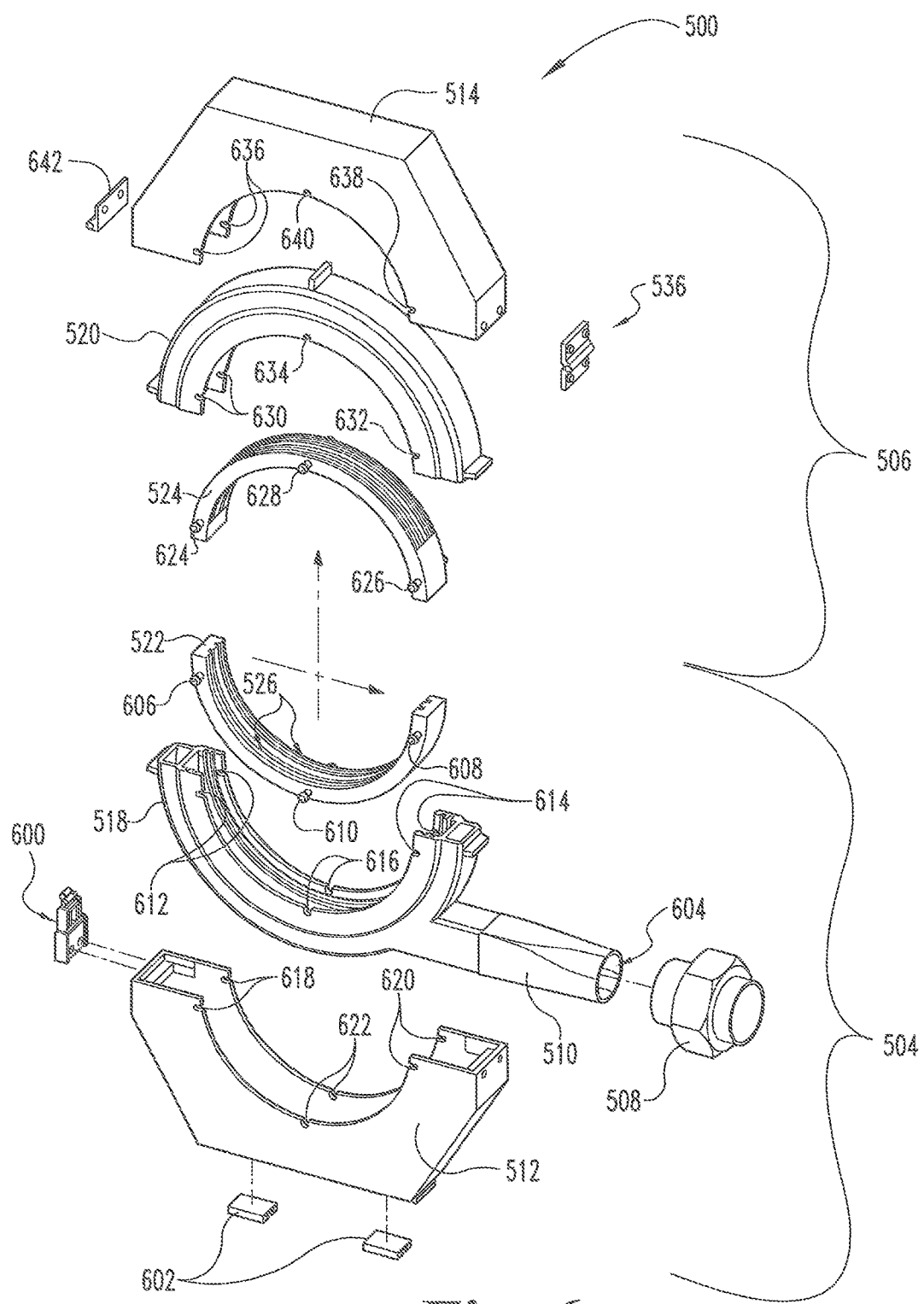
FIG. 6 is an exploded view of the applicator apparatus of FIG. 5.

Referring to FIGS. 4-6, an exemplary embodiment of an extrusion system is shown for increasing the stiffness of the extruded material, and in particular, the skin or outer layer of the material by gelling the binder component of the batch material. The system 400 includes a conventional extruder 402 and die assembly 404 for forming a desired extrudate. Batch material can enter the extruder 402 through an inlet (not shown) and pass through a twin screw extrusion apparatus to mix, screen, de-air, convey and force the batch material through the die assembly 404. As the extrudate passes through the die assembly 404, it takes the form of a wet log 426 that is supported by a pocket of air disposed along an air bearing 428. The air bearing 428 comprises an aluminum body having a plurality of holes defined therein through which air passes. The air bearing 428 can have a cross-sectional shape contoured to match that of the wet extrudate 426 to provide support to the extrudate 426.

The system 400 can include a power supply 414 which provides power to a main controller 416. The main controller 416 can be electrically coupled and in communication with a programmable logic controller 412, or PLC. The PLC 412 can be programmed through software, calibration, computer-readable instructions, program loops, etc. to control the operation of the system 400. The PLC 412 and its functionality will be described in further detail below.

In FIG. 4, the system 400 includes an encoder 422 that measures the extrusion velocity of the extrudate 426. The encoder 422 can be in electrical communication with the PLC 412 either through a wireless network or through a wired communication link. The communication link 432, either wired or wireless, allows the PLC 412 to control various devices within the system.

The system 400 also includes a cutting tool 424. The cutting tool 424 can be a wet saw, a cutting blade, or any known cutting device. The cutting tool 424 can move at a velocity substantially the same as the extrusion velocity. In addition, the cutting tool 424 can have its own controller for controlling the cutting step and the timing of making a cut. Alternatively, the cutting tool 424 can be operably coupled to either the main controller 416 or PLC 412.

In the embodiment of FIG. 4, the system 400 can further include a temperature unit 410 for adjusting the temperature of the extrudate 426 once it exits the extruder 402. The temperature unit 410 is electrically coupled to the main controller 416, but can be operably coupled and controlled by the PLC 412 in some embodiments. A communication link 436 can be provided between either the main controller 416 or PLC 412.

The temperature unit 410 can include an inlet and an outlet. The inlet can be fluidly coupled to a fluid supply 406. The fluid supply 406 can contain a process gas such as compressed air, compressed nitrogen or argon. In other embodiments, a liquid such as water may be contained in the fluid supply 406. For purposes of this disclosure, the fluid supply can contain a liquid or gas that is supplied to the temperature unit 410. As such, the term "fluid" can be referred to as a gas or liquid.

A flow meter 408 can be coupled between the fluid supply 406 and temperature unit 410 to measure the fluid flow. The flow meter 408 forms part of a measurement unit of the system 400 and can be electrically coupled to the PLC 412. The electrical coupling can allow for signals to pass through a wired or wireless connection 430 between the flow meter 408 and PLC 412. In this arrangement, the PLC 412 can monitor and control the flow rate of the fluid supply to ensure uniform flow. As the fluid flows into the temperature unit 410 through the inlet, the fluid temperature can be adjusted depending on a desired or threshold temperature. In many instances, the temperature unit 410 functions as a heater for increasing the fluid temperature. There may be other instances, however, where the fluid temperature is decreased such that the temperature unit 410 functions as a cooler. The temperature unit 410 desirably provides a uniform change in temperature of the fluid passing therethrough.

The outlet of the temperature unit 410 is fluidly coupled to an applicator apparatus 418. The applicator apparatus 418 is spaced from the extruder 402 and disposed between the cutting tool 424 and extruder 402. As will be described in more detail with reference to FIGS. 5 and 6, the applicator apparatus 418 receives the fluid from the temperature unit 410 and uniformly directs the fluid onto the extrudate 426 passing through an opening in the applicator apparatus 418.

It is desirable for the fluid to be directed onto or applied uniformly to the skin layer of the extrudate 426 so that the binder component reaches its gelation temperature. If a portion of the skin layer is not exposed to the uniform flow of the fluid, the material that forms the walls of the internal cells may not stiffen to a desired stiffness and therefore may collapse when the cutting tool 424 cuts through the material. The structure and manner in which the fluid is uniformly dispensed through the applicator apparatus is shown in FIGS. 5 and 6. Furthermore, it can be desirable for the fluid to reach a uniform temperature that is at or greater than the gelation temperature of the binder component. Thus, the fluid can be exposed to the skin layer of the extrudate 426 at both a substantially uniform flow and temperature.

Before turning to FIGS. 5 and 6, however, the measurement portion of the system 400 can also include a temperature sensor 420. The temperature sensor 420 can be in the form of a thermocouple, an infrared thermal image camera or electronic imaging device, a pyrometer temperature sensor, or other known sensing device for detecting a temperature. The temperature sensor 420 can be disposed in a location to measure the skin temperature as the extrudate 426 passes through the applicator apparatus 418. The temperature sensor 420 can be in electrical communication with the PLC 412 through a wired or wireless communication link 434. Therefore, during operation of the system, the encoder 422 can communicate the extrusion velocity to the PLC 412 of the extrudate 426 passing through the system. The flow meter 408 can send a signal to the PLC 412 indicating the flow rate of the fluid being supplied to the temperature unit 410 and the temperature sensor 420 can send temperature measurements to the PLC 412 indicating whether the skin temperature has reached a threshold temperature at which the binder component gels. Based on these measurements, the PLC 412 can control the output of the temperature unit 410 (e.g., increase the output of the heater to increase the fluid temperature), the flow rate of the fluid supplied by the fluid supply 406 (e.g., the amount a valve is opened), or in some instances, even the extrusion rate (e.g., the rotational velocity of the twin screws).

In view of the above, the process control of the system 400 can uniformly heat the skin around the periphery of the wet extruded ceramic log 426. The skin is desirably heated to a temperature that is sufficient to ensure "gelling" of the organic binder (also referred to as "binder component" in this disclosure) and thereby stiffen the outer periphery or skin layer of the log to eliminate or reduce the grooving defect. The process control can stiffen the skin and the peripheral cellular structure such that both resist smearing that occurs as a result of a cut made by the cutting tool. In doing so, the system can eliminate or significantly reduce the primary initiating factor (smeared closed cells) which causes the skin to collapse inwardly (thereby forming the grooves) as the extrudate continues to extrude. The process control is also able to achieve uniform stiffening of the skin. The uniform application of heat increases the modulus (stiffness) of the skin which inhibits the skin from "sucking in" or collapsing even if a small amount of smearing does occur at the cutting tool. This uniform skin stiffening is a factor which can additionally allow for the reduction/elimination of the generation of skin grooves.

The applicator apparatus 418 of FIG. 4 is structured to uniformly apply heat to the wet ceramic extrudate before the extrudate is cut by the cutting tool 424. Referring to FIGS. 5 and 6, an exemplary applicator apparatus 500 is shown. The apparatus 500 can include a first portion 504 and a second portion 506. The first portion 504 and second portion 506 can be pivotably coupled to one another about a pivot point 536. In one aspect, the pivot point 536 can be a hinged connection. One skilled in the art can contemplate other known means for pivoting the two portions with respect to one another.

The first portion 504 can include an inlet coupler 510. The inlet coupler 510 can define an inlet 604 or opening. As shown in FIG. 5, the inlet coupler 510 can be coupled to a fluid pipe or tube 502 via a connector or fitting 508. The fitting 508 can be threadedly engaged to both the inlet coupler 510 and tube 502. Alternatively, the connection can be a press fit, snap fit, or other known connection means. The fluid pipe or tube 502 can be coupled to the temperature unit 410 and fluid supply 406 in FIG. 4 so that fluid is pushed through the tube 502 and through the inlet 604 of the inlet coupler 510. In this manner, the applicator apparatus 500 is in fluid communication with, or fluidly coupled to, the fluid supply 406 and temperature unit 410. In one aspect, the applicator apparatus 500

The applicator apparatus 500 further includes an outer housing that is formed by a first housing 512 and a second housing 514. When the first portion 504 and second portion 506 are coupled to one another, the first housing 512 and second housing 514 form a single outer housing. A clamp member 516, which includes a clamp portion 600 and latch portion 642 (see FIG. 6), can be disposed on either the first housing 512 or second housing 514 for coupling the two housings together. When coupled to one another, the first and second housings can form a substantially hexagonally-shaped structure. In other embodiments, however, the housings can form semicircular-shaped or hemispherical-shaped or other desired shaped structures. Alternatively, the first housing 512 can take on a different size and shape than the second housing 514.

As shown in FIG. 6, the first housing 512 and second housing 514 are substantially hollow and have a curved inner boundary. One or more mounting plates 602 can be coupled to either housing for purposes of mounting the applicator housing 500 to another structure (e.g., railing or beam). When the two housing are coupled to one another, the curved inner boundaries define an opening in the housing to allow an extrudate to pass through. In particular, as the extrudate passes through the opening defined in the housing, the first housing 512 and second housing 514 completely surround the extrudate. This allows for the entire periphery or skin layer of the extrudate to be exposed to fluid passing through the applicator apparatus 500. The opening in the housing through which the extrudate passes can be centrally defined with respect to the first housing 512 and second housing 514. In other embodiments, the opening may be defined offset with respect to the first and second housings.

The applicator apparatus 500 can include a first inner housing 518 and a first insert 522. The first inner housing 518 can be structured slightly smaller than the first outer housing 512 so that it fits therein. The first inner housing 518 can have an outer diameter and an inner diameter. The inner diameter can correspond or substantially align with the curved inner boundary of the first housing 512. Thus, the first inner housing 518 does not interfere with the extrudate passing through the applicator apparatus 500. The first inner housing 518 is also coupled to the inlet coupler 510. This can be an integral coupling, a threaded coupling, a press-fit coupling, a snap-fit coupling or other known means for coupling the first inner housing 518 to the inlet coupler 510.

The first insert 522 can be structured in a crescent-like manner having an inner and outer diameters. The size and shape of the first insert 522 is such that it can be removably coupled to the first inner housing 518, where the first inner housing 518 substantially surrounds the first insert 522 when coupled. The first insert 522 can have a plurality of tabs or pins 606, 608, 610 that protrude longitudinally outward therefrom. When coupling the first insert 522 to the first inner housing 518, the first pin 606 engages a first opening or slot 612 in the first inner housing 518. Likewise, the second pin 608 engages a second slot 614 and the third pin 610 engages a third slot 616. In this manner, the first insert 522 is coupled to the first inner housing 518 and is unable to rotate or pivot more than a few degrees, if at all.

The applicator apparatus 500 also includes a second inner housing 520 and second insert 524 that are both structured and coupled to one another in a similar manner as the first inner housing 518 and first insert 522. In particular, the second insert 524 can include a pin 624 that engages a corresponding slot 630 in the inner housing 520. Likewise, a second pin 626 and third pin 628 can engage slots 632, 634, respectively.

With reference to FIG. 5, the first insert 522 and second insert 524 are substantially surrounded by both the first and second outer housings and first and second inner housings, respectively. As such, the first and second inserts are disposed in close proximity to the extrudate passing through the applicator apparatus 500. Both the first and second inserts include at least one opening or slot defined radially about its inner diameter. For purposes of this disclosure, the radial direction is indicated by line R-R and the longitudinal direction is indicated by line X-X in FIG. 5. The opening can comprise a plurality of openings defined radially about the first and second inserts.

In the illustrated embodiment of FIG. 5, the opening is in the form of a plurality of radially defined slots 526 defined in the first insert 522 and a corresponding number of slots 528 in the second insert 524. These radially-defined slots 526, 528 can be spaced from one another about the longitudinal direction X-X so that each insert can include two or more slots. In turn, each radially-defined slot forms the outlet of the applicator apparatus 500. The slots 526, 528 can be configured such that the fluid flows in a direction substantially perpendicular to the longitudinal direction X-X towards the extrudate. Alternatively, the slots 526, 528 can be disposed at an angle relative to the longitudinal direction. When the first portion 504 and second portion 506 are coupled to one another, the applicator apparatus 500 can have a plurality of outlets through which the fluid exits the apparatus and is directed onto the skin layer of the extrudate.

To further understand the fluid flow through the applicator apparatus 500, the first and second inner housings can define an outer fluid chamber 530 and an inner fluid chamber 532. Each of the outer fluid chamber 530 and inner fluid chamber 532 are defined in the first and second inner housings. The outer fluid chamber 530 and inner fluid chamber 532 are fluidly coupled to one another through a plurality of feed orifices (not shown) defined in a baffle plate 534. The baffle plate 534 is disposed between the two chambers so that fluid flows from the outer chamber 530 into the inner chamber 532 in a uniform manner.

In this embodiment, the baffle plate 534 builds fluid pressure in the outer chamber 530 to increase the flow uniformity. Thus, as fluid passes through the inlet 604 of the applicator apparatus 500, the fluid enters the outer chamber 530. Fluid can circulate about the outer chamber 530 between the first inner housing 518 and second inner housing 520. As pressure builds in the outer chamber 530, feed holes defined in the baffle plate 534 allows fluid leakage into the inner chamber 532. Once the fluid enters the inner chamber 532, the outlet or slots 526, 528 are fluidly coupled to the inner chamber 532 to allow fluid to be applied or directed onto the skin layer of the extrudate. The fluid can be uniformly applied or directed onto the extrudate to increase the skin temperature to a desired or threshold temperature. With the flow being uniform as it contacts the extrudate, the skin layer is also exposed to a uniform temperature difference between the fluid temperature and the skin temperature before passing through the applicator apparatus 500. In other words, the fluid passes through the temperature unit and achieves a desired, uniform temperature. Thus, the skin layer is exposed to both uniform flow and temperature to cause the organic binder to gel.

Figure 7:
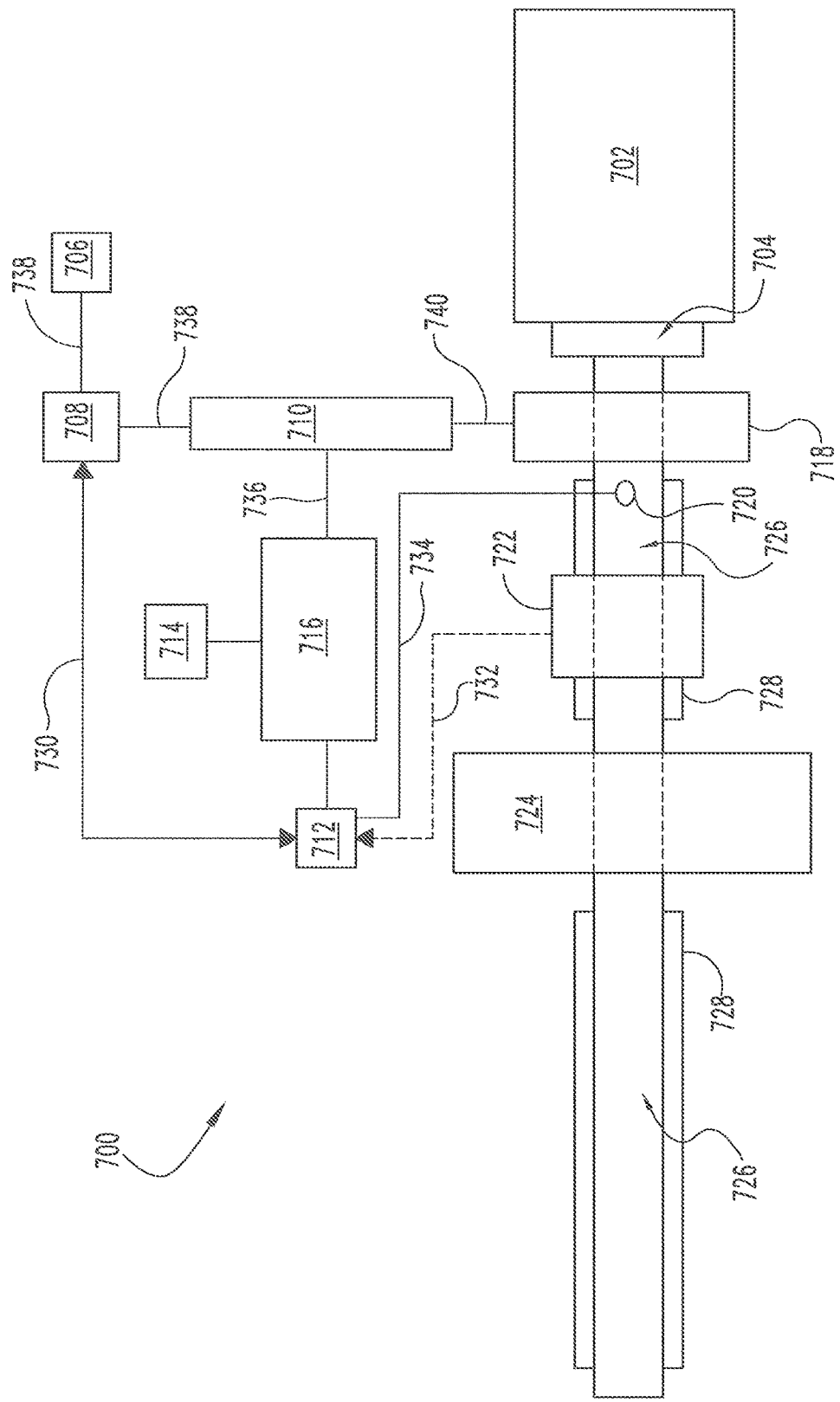
FIG. 7 is a block diagram of a second embodiment of an extrusion system.

Referring to FIG. 7, another embodiment of an extrusion system 700 is provided. The different components and features of FIG. 7 are similar to the components and features of FIG. 4 and are labeled as such with reference numbers beginning with a '7' rather than a '4'. For example, the wet ceramic extrudate 426 in FIG. 4 is labeled as 726 in FIG. 7.

Similar to the system 400 of FIG. 4, the system 700 includes a programmable logic controller (PLC) 712 that is able to control the extrusion process and make necessary adjustments to ensure the gelation of the organic binder in the extrudate 726. The PLC 712 can have memory for storing instructions in the form of software to achieve a desired extrusion process. The PLC 712 is coupled to a main controller 716. The main controller 716 is powered by a power supply unit 714 and provides current to a temperature unit 710 via link 736. The amount of current sent by the main controller 716 to the temperature unit 710 can be adjusted to control the temperature output of the unit. The PLC 712, which is in electrical communication with a temperature sensor 720 through communication link 734, can communicate with the main controller 716 to adjust the output of the temperature unit 710.

The temperature sensor 720 can be a thermocouple, an infrared thermal image camera or digital imaging device, a pyrometer, or any combination thereof. There can be one or more sensors 720 to measure the skin temperature of the extrudate 726 at multiple locations along the extrudate. The temperature sensor 720 can be disposed in a location adjacent to an applicator apparatus 718 so that as the extrudate 726 passes through the apparatus 718, the sensor 720 measures the skin temperature and communicates that measured temperature to the PLC 712.

The applicator apparatus 718 in FIG. 7 is disposed adjacent to the outlet of an extruder 702. The extruder 702 can include a die 704 near a front face of the extruder 702. As the extrudate 726 is extruded through the die 704, an air bearing 728 similar to the bearing 428 in FIG. 4 provides an air pocket of support to the extrudate 726. The air bearing 728 supports the extrudate 726 as it passes through the applicator apparatus 718 and cutting tool 724. The cutting tool 724 can be a wet saw, blade, knife, or other known means for cutting the extrudate at a desired location.

Figure 8:
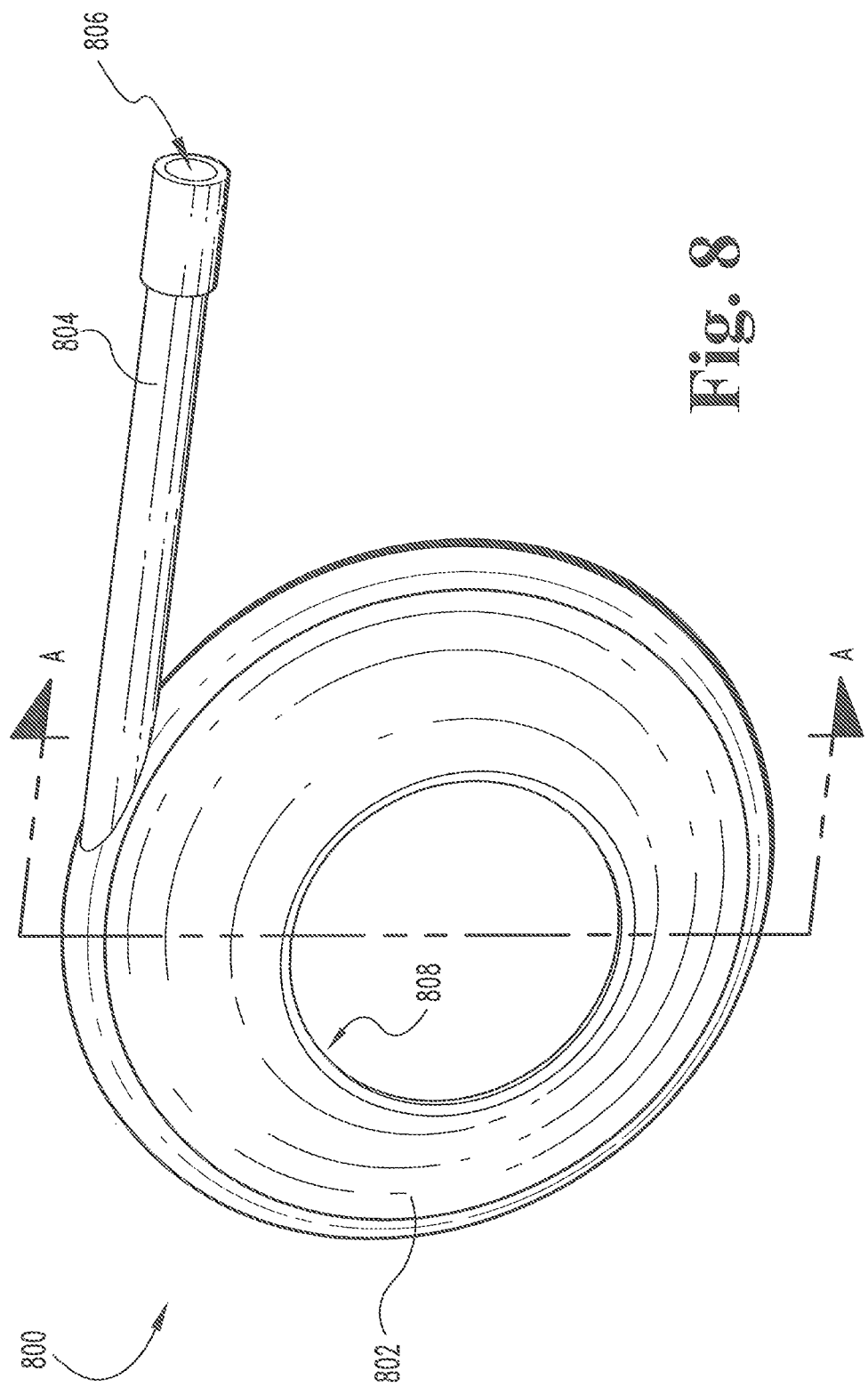
FIG. 8 is an isometric view of a second embodiment of an applicator apparatus.

The system 700 can also include an encoder 722 for measuring the extrusion velocity of the system. The encoder 722 can be in electrical communication with the PLC 712 to transmit extrusion measurements thereto through communication link 732. The PLC 712 is also in electrical communication with a flow meter 708 through communication link 730. Communication links 730, 732, and 734 can be wired or wireless links The flow meter 708 is disposed between a fluid supply 706 and the temperature unit 710. The fluid supply 706 can contain a fluid, e.g., liquid or gas, such as compressed air, compressed nitrogen, argon, etc. The fluid supply 706 can include a pump or other supply means for dispensing the fluid from the fluid supply 706 to the temperature unit 710 through a fluid line 738. As the fluid passes through the temperature unit 710, it flows to the applicator apparatus 718 through fluid line 740. Referring to FIG. 8, a portion of the fluid line 740 is shown as inlet tube 804 of an applicator apparatus 800.

In reference to the systems illustrated in FIGS. 4 and 7, one difference is the location of the applicator apparatus relative to the extruder. In FIG. 4, the applicator apparatus 418 is downstream from the extruder 402. In particular, the applicator apparatus 418 is positioned adjacent to the cutting tool 424 so that the distance traveled by the extrudate 426 from the applicator apparatus 418 to the cutting tool 424 is minimized By keeping this distance short, the amount of heat dissipating from the wet ceramic extrudate between the apparatus 418 and cutting tool 424 can be substantially reduced. This can help reduce or prevent the internal cells near the skin layer from being smeared and collapsing when cut by the cutting tool 424. In other words, the skin layer is stiffer as it is cut by the cutting tool 424 since there is less of a temperature drop due to the positioning of the applicator apparatus 418 relative to the cutting tool 424.

Figure 9:
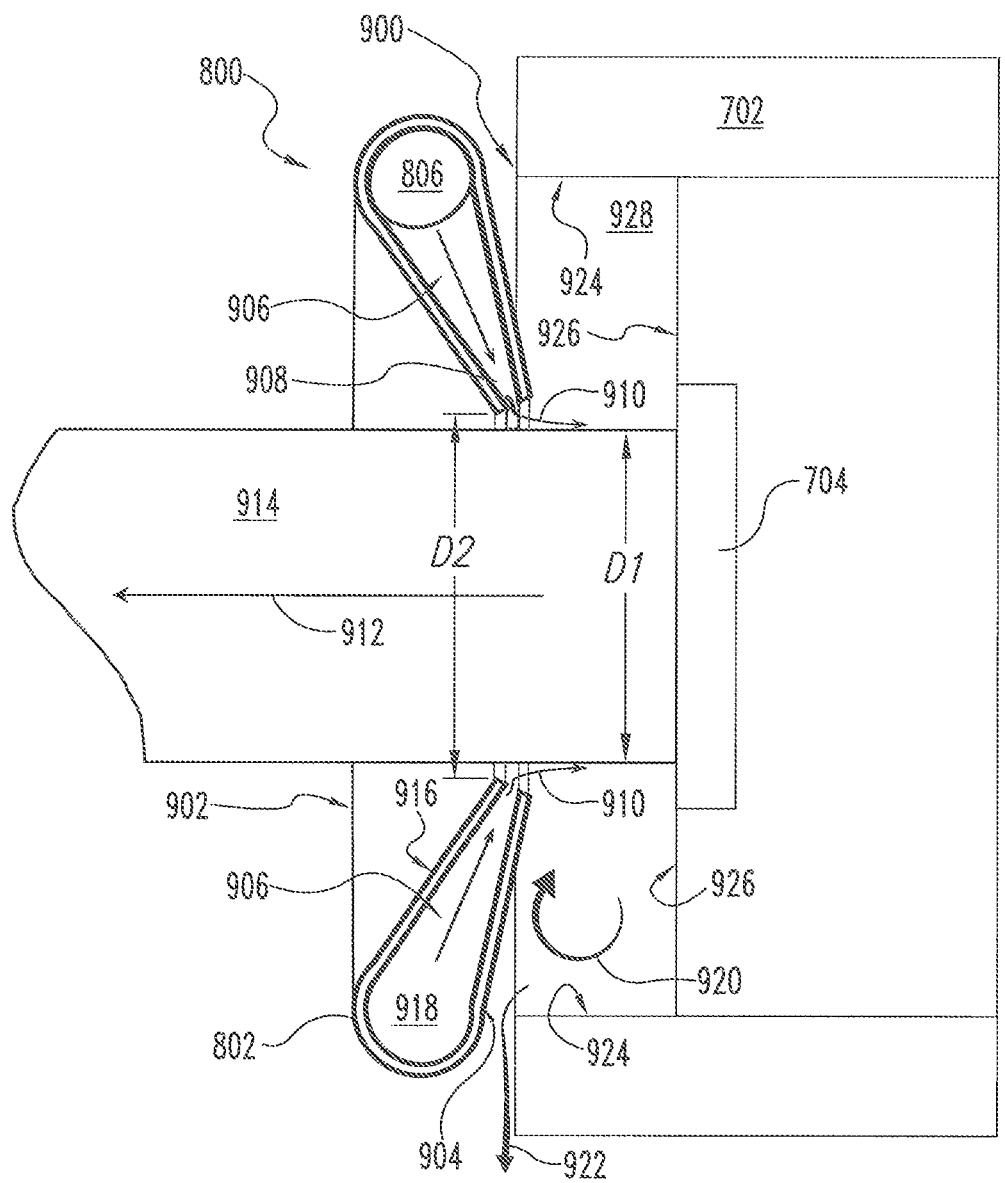
FIG. 9 is a cross-sectional view of the applicator apparatus of FIG. 8.

In FIG. 7, however, the applicator apparatus 718 is disposed adjacent to the extruder 702 and spaced further from the cutting tool 724. This positioning can be advantageous depending on the type of applicator apparatus used in the system. One such embodiment of an applicator apparatus that may benefit from this placement is shown in FIGS. 8 and 9. Here, an applicator apparatus 800 has a frustoconically-shaped body or housing 802. The housing 802 can have an outer diameter and inner diameter, where the inlet tube 804 is coupled to or near the outer diameter. The inlet tube 804 can be substantially hollow with a defined passageway. The passageway can include an inlet 806 which couples to the fluid line 740 of FIG. 7. Thus, as fluid exits the temperature unit 710, it passes through the fluid line 740 and inlet 806 into the housing 802 of the applicator apparatus. Once the fluid enters the housing 802, it can be directed along a fluid path therein and out through an outlet 808 of the apparatus 800. The outlet 808 can be in the form of one or more orifices radially defined about the inner diameter of the housing 802. Alternatively, the outlet 808 can form one or more radially-defined slots similar to those in FIG. 5.

To further illustrate the flow path of fluid through the applicator apparatus 800, FIG. 9 is a cross-section of the apparatus taken along line A-A of FIG. 8. As shown, the apparatus 800 includes a flat portion 902 near the outer diameter thereof and a substantially conical portion 904 that angles from the flat portion 902 toward the extruder 702. This forms a bowl-like or concave-like shape having an inner surface 916. The inner diameter, D2, of the applicator apparatus 800 is greater than the outer diameter, D1, or width of the extrudate 914 so that the extrudate 914 can pass through the apparatus 800.

As shown in FIG. 9, fluid can enter the applicator apparatus 800 through an inlet 806. As the fluid enters near the outer diameter of the apparatus 800, it circulates about the outer diameter where, due to the size and shape of the apparatus, the fluid pressure builds in a chamber-like portion 918 of the apparatus 800. The fluid then begins to flow along direction 906 towards the extrudate 914. An outlet 908 of the applicator apparatus 800 is defined near the inner diameter and can take the form of one or more openings. The openings can comprise a defined orifice, hole, slot or combination thereof. As shown, the outlet 908 is defined in close proximity to the extrudate 914 so that as fluid exits through the outlet 908 along direction 910 it is directed into contact with the skin layer of the extrudate 914.

The extrudate 914 is moved through the extruder 702 and die 704 along the extrusion direction, which is identified by arrow 912. As a uniform flow of fluid exits the outlet 908 of the applicator apparatus 800 along direction 910 it contacts the skin layer along its entire perimeter. In addition, with the applicator apparatus 800 disposed adjacent to the extruder 702, an annular cavity 928 is formed between the extruder 702, extrudate 914, and conical portion 904 of the applicator apparatus 800. In particular, the extruder 702 includes a front face 900 that extends past the die 702 and forms an outer lip. As a result, the outer lip has an inner surface 924 that substantially surrounds the extrudate 914. Another surface 926 which is substantially perpendicular to the surface 924 and substantially aligned with the die 704 also forms the cavity 928. Therefore, as fluid exits the applicator apparatus 800 it is directed into contact with the extrudate 914 and towards the surface 926. The fluid can then circulate about direction 920 within the cavity 928 to further heat the skin layer of the extrudate 914. As pressure builds within the cavity 928, fluid can leak along a direction 922 through a gap defined between the conical portion 904 of the applicator apparatus 800 and the extruder 702.

As shown and described above with respect to each applicator apparatus, the outlet of each apparatus can comprise a ring of defined openings spaced closely together, a single, annular slot, or a plurality of annular slots. The ring of defined openings can provide sufficient air flow and is particularly beneficial when it is desired to provide a heat concentration in one or more areas. The embodiments which include one or more annular slots can provide a more uniform flow about the skin layer of the extrudate. The slots can be sized to provide a desired amount of flow to achieve gelation of the organic binder.

Figure 10:
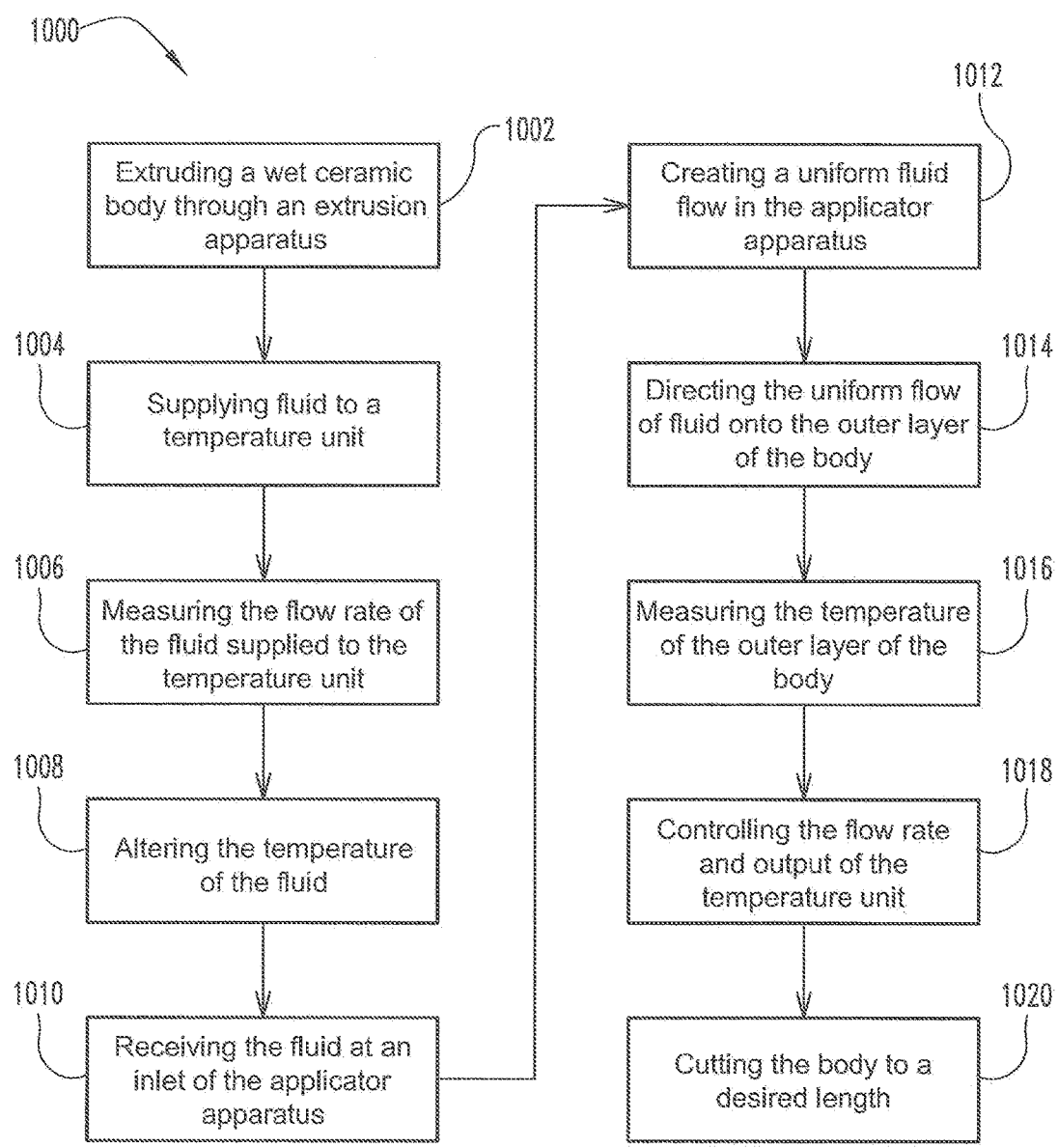
FIG. 10 is a flow chart of an extrusion process.

The process methodology and control for increasing the organic binder temperature past its gelation point has been described and referenced above in some detail. In FIG. 10, an exemplary method for controlling the gelation of the organic binder. The method 1000 is not intended to be limiting as it may be different depending on the type of application apparatus used in the system and the amount of control the PLC has over different elements of the system. As a means for further explaining the process control method 1000, reference may be made to the embodiments of FIGS. 4-9.

As shown in FIG. 10, the method 1000 can include a plurality of steps. This again is only an example and not intended to represent every possible control method provided for in this disclosure. In some control methods, there can be additional or fewer steps involved. In addition, the performance of these steps can occur in different orders and thus the arrangement of steps in FIG. 10 is shown only as one such embodiment.

In step 1002, the method 1000 provides for the extrusion of a wet ceramic body (or extrudate, log, etc.) through an extrusion apparatus. The extrusion apparatus can include a ram, twin or single screw, or other known means for extruding batch material through the extruder. Batch material can include different components including an organic binder having a temperature at which the organic binder gels. In this method, the desired or threshold temperature corresponds to this temperature at which the organic binder reaches its gelation point.

In step 1004, a fluid supply or drum can contain a fluid such as compressed air, compressed nitrogen, argon, or other known process gas. The fluid can also be a liquid depending on the embodiment. The fluid supply can include a valve or other metering device to release the fluid from the supply to a temperature unit. The fluid supply and temperature unit can be coupled or connected to one another by a fluid line. The amount of fluid and rate of supplying the fluid can be controlled by a controller, such as a programmable logic controller (PLC). Alternatively, the fluid supply can have its own controller which is in electrical communication with a system controller or PLC. In this manner, a PLC can control the amount of fluid being supplied to the temperature unit and adjust this amount to achieve the desired temperature of the organic binder.

A flow meter can be coupled or mounted to the fluid supply line between the fluid supply and temperature unit. In step 1006, the flow meter can measure the flow rate of fluid being supplied to the temperature unit. As such, the flow meter can be in electrical communication with the PLC to send measurement data to the PLC. As the PLC adjusts the flow rate of the fluid supply, the flow meter can repeatedly and continuously measure the flow rate and communicate the measured flow rate to the PLC. The flow meter may also include a valve or other metering means to control the fluid flow rate.

Turning to step 1008, the fluid temperature can be controlled or adjusted as deemed necessary by the PLC. In particular, the temperature of the fluid passing through the temperature unit can be affected by either being increased or decreased as desired. This can be based on the measured temperature of the skin layer of the wet ceramic body. There may be other needs for increasing or decreasing the temperature of the fluid as it passes through the temperature unit. In the embodiment in which it is desired to heat the skin layer of the wet ceramic body, the temperature unit can output heat to increase the temperature of the fluid passing therethrough. Moreover, the temperature unit adjusts the temperature of the fluid to a substantially uniform temperature. In one aspect, the temperature unit can adjust the fluid temperature to a substantially uniform temperature at or above the gelation temperature of the organic binder.

In step 1010, the fluid exits the temperature unit and passes through an inlet of an applicator apparatus. The inlet can be defined near an outer diameter or periphery of the applicator apparatus similar to the embodiments illustrated in FIGS. 5-6 and 8-9. As the fluid is received at the inlet of the applicator apparatus, the fluid flow is made uniform in step 1012. This was described, for example, with reference to FIGS. 5 and 6 where the fluid circulates about an outer chamber 530 of the applicator apparatus. A baffle plate 534 with feed orifices defined therein is disposed between the outer chamber 530 and an inner chamber 532 such that as fluid pressure builds in the outer chamber 530 fluid leaks through the feed orifices into the inner chamber 532. This can create a uniform flow of fluid into the inner chamber 532 of the applicator apparatus. The outlet of the applicator apparatus also creates a uniform fluid flow based on the arrangement and configuration of openings or slots.

In step 1014, the fluid flow can be directed uniformly onto the outer or skin layer of the wet ceramic. As described in the previous embodiments, the applicator apparatus can include an outlet defined by a plurality of openings or slots through which the fluid flows. The plurality of openings or slots can be disposed radially about the inner diameter of the applicator apparatus. In one embodiment, a plurality of openings is defined at the outlet of the applicator apparatus. In another embodiment, a single, thin slot is defined at the outlet. The slot is formed about the entire inner diameter of the applicator apparatus such that as the wet ceramic body passes through the applicator apparatus, the entire outer layer is exposed to the fluid exiting the apparatus. In a similar embodiment, two or more thin slots are defined at the outlet where each slot is spaced from an adjacent slot. The slots can be spaced longitudinally or radially from each other.

As the outer layer, or skin layer, of the wet ceramic body is exposed to the fluid, the body continues to move along an extrusion direction and passes through an opening defined in the applicator apparatus. As the body passes through, a temperature sensor measures the outer layer temperature in step 1016. The temperature measurement can be used to determine whether the organic binder has reached its gelation point, and thus has been stiffened before reaching a cutting tool. The PLC can be programmed to receive the temperature measurement from the temperature sensor and determine if the skin temperature meets a threshold temperature. Although not shown as a step in the method 1000, the PLC can also be in electrical communication with an encoder that measures the extrusion velocity.

In step 1018, the PLC can determine if the measured temperature satisfies the threshold temperature at which the organic binder will gel. In the event the measured temperature does not satisfy the threshold temperature, the PLC or other controller can adjust the flow rate of fluid being supplied by the fluid supply. The PLC may also adjust the output of the temperature unit to either increase or decrease the fluid temperature of the fluid passing therethrough. In the embodiments of FIGS. 4 and 7, a main controller supplies current to the temperature unit. In these embodiments, the PLC can instruct the main controller to either supply more or less current to the temperature unit. The PLC may also determine to control the extrusion rate. For example, if the extrusion rate is reduced, the wet ceramic body does not pass through the applicator apparatus as quickly and thus the outer layer is exposed to the fluid for a longer time period. In one embodiment, the PLC may only control either the flow rate, output of the temperature unit, or the extrusion rate. In another embodiment, the PLC may only control two of these three outputs. In a different embodiment, the PLC may adjust or control each of the three outputs until the measured skin temperature satisfies the temperature threshold for gelation of the organic binder.

In step 1020, the wet ceramic body can be cut to a desired length by a cutting tool such as a wet blade, saw, knife or other known cutting device. By controlling the flow rate, temperature of the fluid, and extrusion rate, the control method 1000 can increase the temperature of the organic binder in the wet ceramic body to its gelation point. As a result, the body can be stiffened so that as the body is cut to a desired length the internal cells near the skin layer are not smeared or collapsed. As a result, skin grooves and related defects can be reduced or eliminated by the systems and methods described in the present disclosure.

While exemplary embodiments incorporating the principles of the claimed invention have been disclosed hereinabove, the present disclosure is not limited to the disclosed embodiments. Instead, this disclosure is intended to cover any variations, uses, or adaptations of the claimed invention using its general principles. Further, this application is intended to cover such departures from the present disclosure as come within known or customary practice in the art to which the claimed invention pertains and which fall within the limits of the appended claims.

What is claimed is:

1. A method of controlling the stiffness of a wet cellular ceramic extrudate being formed from a batch material having a binder component, comprising: extruding the batch material through an extrusion apparatus to form the wet cellular ceramic extrudate; supplying fluid to a temperature unit; controlling the temperature of the fluid at the temperature unit; moving the wet cellular ceramic extrudate from the extrusion apparatus to an applicator apparatus; directing the fluid from the temperature unit through a plurality of openings defined radially in the applicator apparatus; contacting an outer layer of the wet cellular ceramic extrudate with a uniform flow of the fluid; increasing the temperature of the binder component to its gelation point with the fluid; passing the wet cellular ceramic extrudate through the applicator apparatus along an extrusion direction to stiffen the wet cellular ceramic extrudate; and cutting the stiffened wet cellular ceramic extrudate with a cutting tool spaced from the applicator apparatus, wherein the applicator apparatus is disposed between the cutting tool and the extrusion apparatus.

2. The method of claim 1, further comprising measuring the temperature of the wet cellular ceramic extrudate as it exits the applicator apparatus.

3. The method of claim 2, further comprising:
measuring a flow rate of the fluid being supplied to the temperature unit; and
measuring a rate of extrusion of the wet cellular ceramic extrudate.

4. The method of claim 3, further comprising determining if the measured temperature corresponds to a threshold temperature at which the binder component reaching its gelation point;
    wherein, if the measured temperature is below the threshold temperature, the method comprises adjustably controlling the fluid flow rate, the rate of extrusion, or the output of the temperature unit until the measured temperature reaches the threshold temperature.

5. The method of claim 1, further comprising:
    receiving the fluid in an outer chamber of the applicator apparatus;
    circulating the fluid about the outer chamber;
    leaking the fluid through a plurality of openings defined in a baffle plate disposed between the outer chamber and an inner chamber of the, applicator apparatus; and
    passing the fluid uniformly through one or more slots or through-holes defined in an insert of the applicator apparatus.

6. The method of claim 1, further comprising preventing the outer layer from collapsing due to the cutting step.

7. The method of claim 1, wherein the applicator apparatus is positioned adjacent to the cutting tool.

\* \* \* \* \*